April 24, 1945.　　　　O. JACOBSEN　　　　2,374,353
LIQUID-TIGHT SEAL
Filed March 19, 1942　　　2 Sheets-Sheet 1
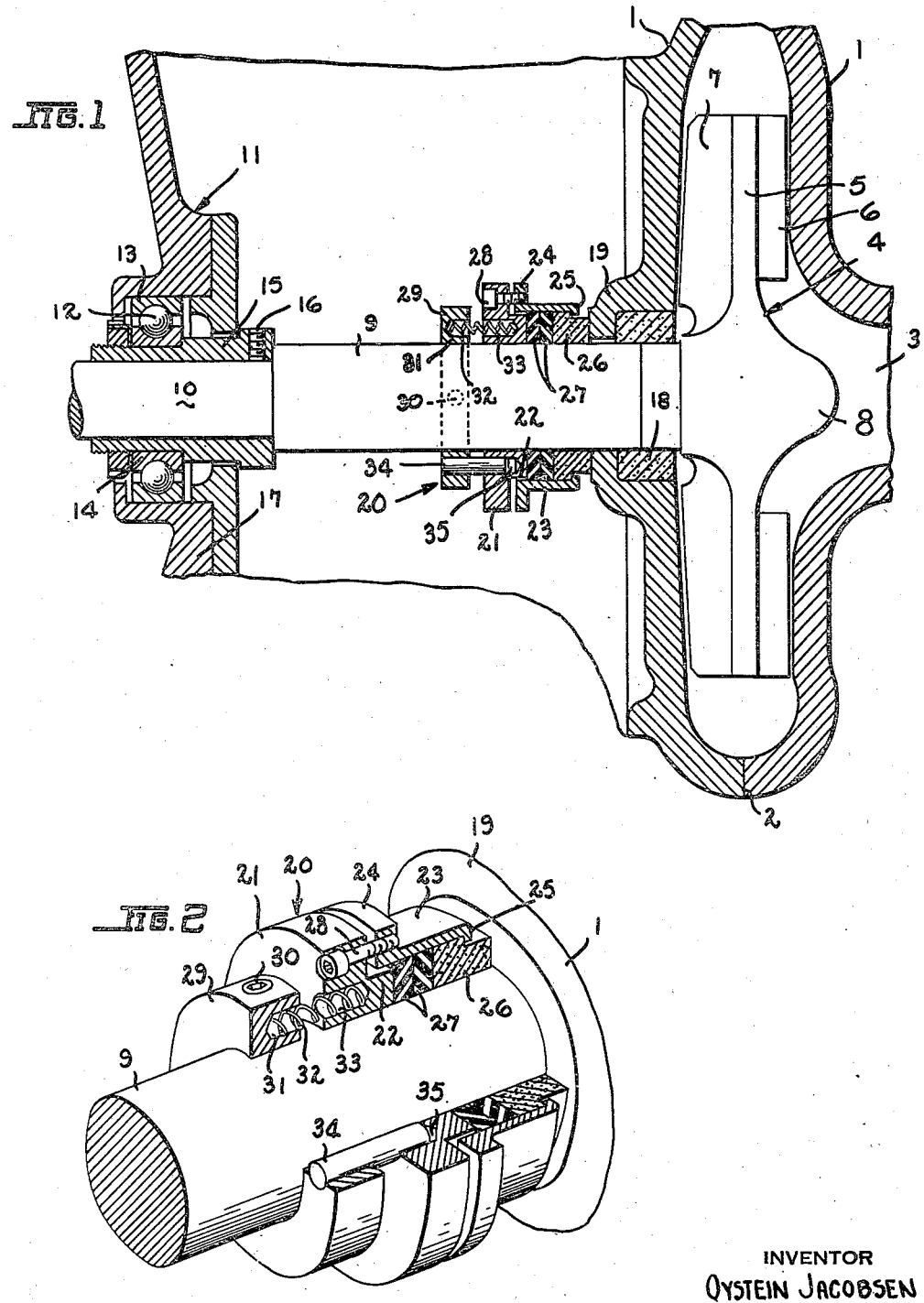
INVENTOR
OYSTEIN JACOBSEN
BY
ATTORNEY

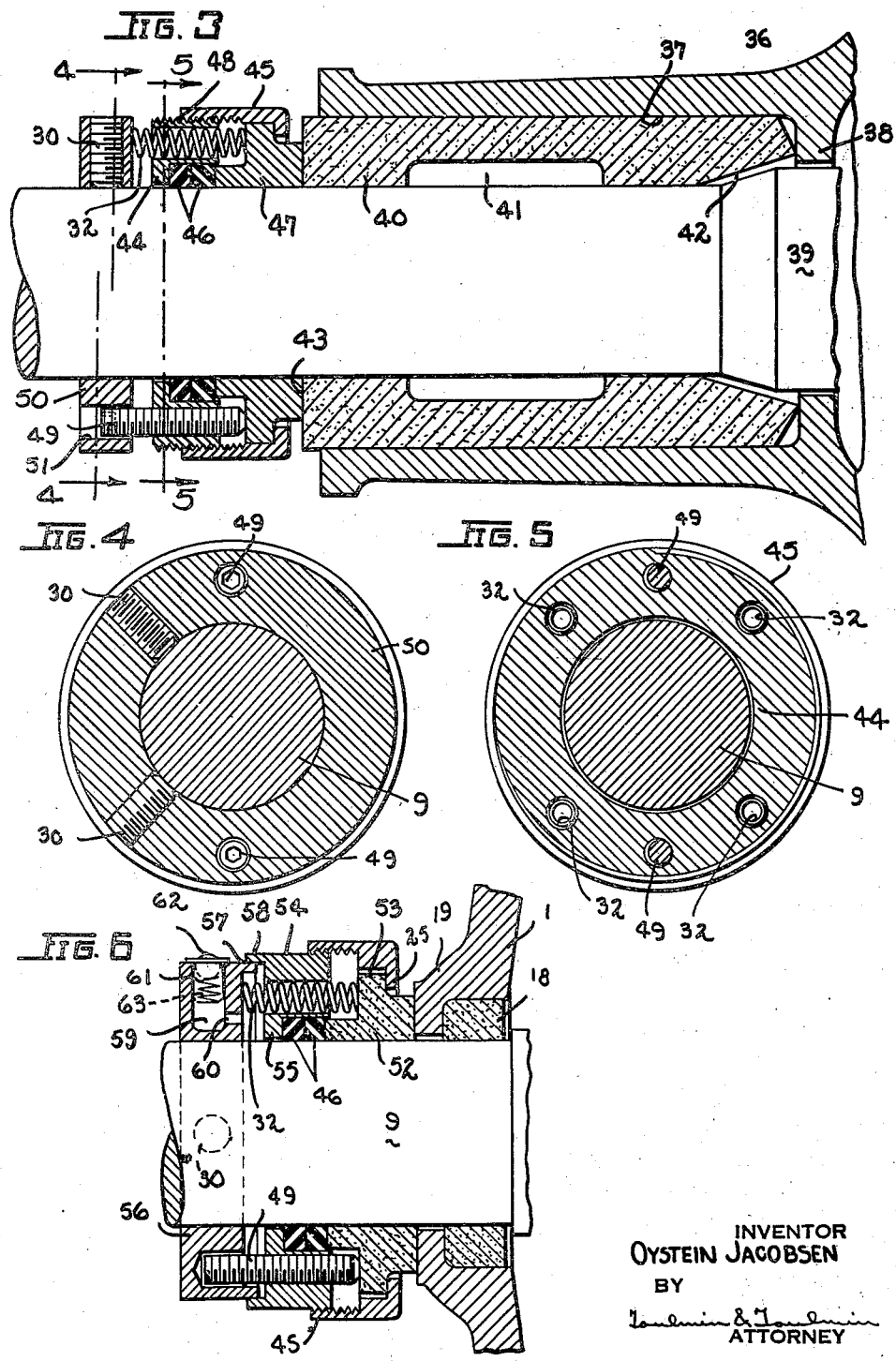

Patented Apr. 24, 1945

2,374,353

UNITED STATES PATENT OFFICE 2,374,353

LIQUID-TIGHT SEAL

Oystein Jacobsen, Montgomery County, Ohio, assignor to The Duriron Company, Inc., Dayton, Ohio, a corporation of New York Application March 19, 1942, Serial No. 435,377

8 Claims. (Cl. 286—7)

The present invention relates to centrifugal pumps, and more especially to seals of those pumps designed to operate at considerable velocities and which are adapted to handle corrosive fluids.

When employing a pump for conveying acid-containing solutions, all parts of the pump which come into contact with the corrosive liquid are usually fabricated of non-attackable metal such as silicon iron. Metal of this character is so hard that it is practically unmachinable, so that for the pump shafts it is necessary to use a machinable metal such as high carbon steel, and to take undue precaution in preventing the acid from reaching the shaft. In many standard forms of pumps the impeller is mounted on an overhanging journal which is usually constituted of two or more sets of ball bearings, and in which the inner ball bearing is positioned not far from the impeller. This consideration makes it all the more essential that the interior of the casing shall be effectively sealed from the shaft which extends beyond the casing toward the ball bearings, so that none of the liquid can reach the bearings to impair their effectiveness.

In order to prevent creepage of the corrosive fluid along the pump shaft toward the bearings, it is customary to provide a seal member such as packing rings which exerts a sealing effect in the end thrust and radial directions. A gland is usually provided to take up the wear at the seal, but it is apparent that the pressure exerted by the gland must affect both seal surfaces. Consequently, should a leak occur past only one of the surfaces, tightening of the gland may apply not only tightening pressure against the leaking surface, but also undue pressure against the other surface, which requires no tightening effect, and thus introduces unnecessary friction and wear.

The primary object of the invention is to provide an improved seal which not only effectively serves to prevent the flow of liquid in the end thrust and radial directions, but a seal in which the thrust and radial effects may be separately adjusted.

The general object of the invention is to provide an improved seal structure which may be applied to high velocity pumps operating on corrosive fluids and in which not only a positive sealing effect against creepage along one or more surfaces is obtained, but adjustments may be made in the seal to introduce tightening effects only at those surfaces where leakage occurs.

The invention will be better understood when reference is made to the following description and the accompanying drawings, in which:

Figure 1 is a longitudinal fragmentary sectional view of one typical form that the improved seal may take;

Figure 2 is a perspective view in enlarged form of the improved seal structure per se as shown in Figure 1, with a portion of the structure cut away in order to expose the interior parts;

Figure 3 is a longitudinal sectional view somewhat enlarged of a modified form of the improved seal;

Figures 4 and 5 are transverse sections taken along lines 4—4 and 5—5 in Figure 3, looking in the direction of the arrows;

Figure 6 is a sectional view showing a seal somewhat similar to that illustrated in Figure 3, but using different materials for some of the parts. This figure also shows the use of a grease packing to prevent the entry of acid fumes into any of the component parts of the seal.

Referring more particularly to Figure 1, reference numeral 1 designates a two-part casing, the joint of which is indicated at 2. The casing parts are clamped together by means of a bolted frame (not shown) and the casing as a whole is provided with a peripherally positioned egress opening for the pump fluid and a centrally positioned ingress opening indicated at 3. The casing contains any suitable type of impeller 4, which has been typically illustrated as of the open-face type and comprising a radially extending continuous web 5 with vanes 6, 7 on opposite sides of the web. The web portion is preferably provided with a spherical hub 8 at the ingress opening 3. At the opposite side of the casing the impeller is mounted on a shaft 9 in any suitable and well known manner, the shaft being provided with a turned-down portion 10 which is journaled in a ball bearing structure of any suitable and well known type, generally indicated at 11. The ball bearings 12 have been illustrated as being carried within an outer race 13 and an inner race 14, this inner race being mounted on a sleeve 15 which is carried on the shaft portion 10 and secured thereto by a set screw 16. The ball bearing structure 11 forms part of a frame 17 which may be integrally joined to the structure which clamps the two casing members together.

In the operation of the pump the shaft 9 is actuated, for example, by a motor at relatively high speed, and liquid is drawn in through the ingress opening 3, then through the passageway between the vanes 6, finally leaving the casing at the peripheral opening under high velocity and pressure. Notwithstanding the provision of the vanes 7 on the rear side of the web 5, which vanes are designed to contact the adjacent interior surface of the casing, there is a strong tendency for a certain amount of the fluid to drop down the rear face of the casing in the direction of the shaft 9. In case the pumped liquid is of the corrosive type, i. e., it contains acid, this leakage liquid may reach the steel shaft 9, and unless prevented, will creep along the shaft until it reaches the ball bearings 12. Inasmuch as the casing 1 is made of a non-attackable metal, the acid within the casing can do no harm, but the problem resides in the prevention of the acid from leaving the casing along the joint between the shaft and the casing.

The shaft obviously can not be made of a non-attackable metal since it must be machined to size, and is usually constituted of a high carbon steel which is not immune to acid attack. A partial seal at this point is provided by a graphite packing 18 which is contained in a packing box formed within an outwardly extending hub portion 19 of the casing, but even the packing insert 18 is not sufficiently effective in preventing creepage of deleterious amounts of acid along the shaft, because it will be understood that the acid is under considerable pressure and will flow even through the most minute crack or crevice.

The present invention is directed to an improved form of seal indicated generally by reference numeral 20, this sealing structure being adapted to be used in addition to or in place of any other sealing structure which has been heretofore employed in connection with pumps of this character. The improved seal 20 consists essentially of a stuffing box structure formed in two parts which are adapted to be clamped together, and holding between them a suitable packing material which serves as a radial seal. A packing gland is secured to the stuffing box in order to take care of the end thrust and the entire seal structure is mounted on the shaft 9 and held in position by a set collar in such a way that creepage in the radial and longitudinal directions is positively prevented.

As shown in Figure 1, the stuffing box consists in part of a metal retaining collar 21 which fits slidably over the shaft and is provided with a shoulder portion 22 extending toward the casing. Loosely surrounding the shoulder on the collar 21 there is a packing sleeve 23 provided with a radially extending flange 24 at the side near the collar 21. The opposite end of the sleeve 23 terminates in an inwardly extending lip 25. This lip is adapted to extend over and grip a shoulder provided on a ring 26 of any suitable packing material such as graphite. Positioned between the inner adjacent surfaces of the collar 21 and the graphite ring 26 there is a plurality of packing rings 27 made preferably of synthetic rubber or any other suitable material. It has been found that material sold under the name of Neoprene, Perbunan and Thiokol is satisfactory for this purpose.

The inner diameter of each ring 27 is preferably such as to fit snugly about the shaft 9, while the outer diameter of these rings should have a snug fit with respect to the packing sleeve 23. The right-hand face (as shown in Figure 1) of the graphite ring 26 should be made very smooth so as squarely to fit against the ground face on the hub 19 of the casing. As in the case of the Neoprene rings 27, the interior diameter of the graphite ring 26 should also have a snug fit with respect to the shaft 9, and the portion of the ring 26 having the larger diameter should fit snugly within the packing sleeve 23. The retaining collar 21 is adjustably secured to the flange 24 of the packing sleeve 23 by means of a plurality of machine screws 28 set into countersunk openings in the retaining collar and positioned preferably equidistantly about the collar. It is apparent that as the screws 28 are tightened the lip 25 on the sleeve 23 will grip the collar on the packing ring 26 and will cause the collar 25 and the packing ring 26 to move closer together, thus applying end pressure to the Neoprene rings 27. When the last-mentioned rings are placed under compression, in the manner stated, the inner diametral surfaces of the rings are forced radially inward toward the shaft 9, thus providing a seal in the radial direction between the shaft and the Neoprene rings. In addition to providing an effective radial seal, it is necessary also to seal the joint between the packing ring 26 and the bearing face on the hub 19.

The structure for performing this function consists essentially of a set collar 29 which surrounds the shaft and is positioned a substantial distance away from the left-hand face of the retaining collar 21. The set collar fits slidably on the shaft but is rigidly secured to the shaft by means of one or more set screws 30. The set collar 29 is provided with a plurality of countersunk openings 31 equidistantly spaced about the inner face of the collar, these openings being adapted loosely to receive the corresponding ends of a plurality of compression springs 32. The opposite corresponding ends of the springs 32 are loosely received in countersunk openings 33 equidistantly positioned around the left-hand face of the retaining collar 21. The arrangement is such that when the set screw 30 is loosened and is moved to the right to apply pressure against the springs 32 and thereafter the set screw is tightened, the resulting pressure is communicated through the seal structure as a whole, including the retaining collar 21 and the sleeve 23 to apply pressure between the two adjacent bearing surfaces of the ring 26 and the hub 19 of the casing. As much or as little pressure can be applied to these bearing surfaces by properly adjusting the position of the set collar 29. It is therefore apparent that in the improved structure the screws 28 serve the sole purpose of applying compressional stress to the packing rings 27, and the tightening of these screws has absolutely no effect on the pressure exerted between the ring 26 and the hub 19. It is therefore necessary only to adjust the screws 28 in case it is desired to prevent creepage of corrosive fluid past the rings 27. On the other hand, when it is desired to increase the pressure between the right-hand face of the ring 26 and the casing hub 19, only the position of the set collar 29 need be changed with respect to the shaft 9, thus introducing greater compressional stress on the springs 32, which in turn, serves to move the entire seal structure to the right, as seen in Figure 1.

There is also disclosed an improved seal structure in which the radial seal can be adjusted independently of the end thrust seal so that leakage at any particular position within the seal can be effectively precluded. It will be further noted that the springs 32 are positioned not very far from the diametral boundary of the shaft 9, and this is a distinct advantage in that when the shaft is being rotated at considerable speed the centrifugal force exerted on the springs is not too great. Due to the compactness of position of all of the elements of the improved seal structure, i. e. the feature of positioning all of the elements as close as possible to the shaft, no excessive centrifugal effects are exerted at any position or upon any particular elements of the seal. The improved seal is so effective in preventing the creepage or other form of movement past the rings 27 and past the end surface of the ring 26 that positively no fluid can reach the ball bearings 12 to impart their translational efficiency. The springs 32 serve the important function of providing a predetermined and adjustable amount of flexibility to the seal parts, and this in turn gives greater operating life and effectiveness to the seal. It will be understood that all parts of the seal rotate with the shaft and for this purpose a set pin 34 is driven into the set collar 29 and is received in a fairly snug fit by a countersunk opening 35. This pin constitutes the only driving means between the seal structure proper and the shaft 9 because, in the absence of the pin, the structure would be adapted to slide with small effort applied thereto with respect to the shaft 9.

Figures 3, 4 and 5 show a modified form of the improved seal structure as applied to a pump casing provided with a long extending hub to give a large bearing surface for the shaft. In Figure 3 the pump casing terminates at the center in a long longitudinally extending hollow hub member 36 which is cored out, as indicated at 37, to provide a shoulder 38. The shaft 9 is provided with an enlarged portion 39 at the position of the casing shoulder 38, as indicated, and the space between the shaft and the hub extension 36 is filled with a relatively long sleeve 40 of a suitable bearing material, such as graphite. The sleeve may be provided with an annular groove 41 to reduce the length of the bearing surface, and as shown the sleeve may be provided at its right-hand end with a taper indicated at 42 in order to clear the enlarged portion 39 of the shaft. The left-hand end of the sleeve 40 preferably extends a short distance beyond the hub extension 36 and terminates in an end bearing surface 43.

The seal structure shown in Figure 3 is somewhat similar to that illustrated in Figure 1 in that it employs a retaining collar 44, a surrounding packing sleeve 45, a pair of packing rings 46 preferably of synthetic rubber, and a thrust ring 47. Inasmuch as the thrust ring bears against the graphite sleeve or bushing 40, it is not necessary that the thrust ring shall be made of graphite so that in this case the ring is preferably fabricated of a metal which is non-attackable by corrosive fluids. Instead of providing the machine screws 28 of Figure 1 to clamp the retaining collar 44 to the sleeve 45, the collar and sleeve in Figure 3 are provided with threads indicated at 48, thus forming of the sleeve 45 a packing nut. It is apparent that as the packing nut is tightened on its threads, compressional stress is exerted between the retaining collar 45 and the metal thrust collar 47 to place the Neoprene rings 46 under compression.

There is a pair of headless set screws 49 threaded within suitable openings in the retaining collar 44 and adapted to bear against a shouldered portion of the thrust ring 47. As shown in Figure 4, the set screws 49, in case there are two, may be located in diametral positions about the retaining collar 44. One of the purposes of the set screws 49 is to lock the packing sleeve 45 on the retaining collar 44 when the sleeve is tightened at the threads 48. Thus any incidental jar which may be imposed on the sealing unit during operation cannot cause any loosening of the packing sleeve 45 and the retaining collar so that the packing rings 46 are always held in compression, thus bearing tightly against the shaft 9.

In order to press the thrust ring 47 against the bearing sleeve 40, a set collar 50 is employed similar to that described in connection with Figures 1 and 2, except that a pair of diametrally positioned openings 51 is also provided to receive the outer end of the set screws 49. The collar 50 is secured to the shaft by a pair of headless set screws 30, as in the case of the structure shown in Figures 1 and 2, and in addition a plurality of equidistantly positioned compression springs 32 is employed bearing against the inner face of the set collar 50 and against the shouldered portion of the thrust ring 47. These springs fit loosely within openings provided in the retaining collar 44, and their purpose is resiliently to urge the thrust ring 47 away from the set collar 50 and thus to press the thrust ring against the end bearing surface of the sleeve 40.

It is apparent that inasmuch as the set collar 50 is rigidly secured to the shaft by the set screws 30 and further since the set screws 49 are received within openings in the set collar, these set screws serve the additional purpose of driving members between the rotating set collar and the remaining parts of the seal unit. Thus the set screws 49, in addition to their purpose of locking the various parts of the seal together, function as a driving pin similar to the element 34 in Figure 1. As in the case of the earlier figures described, the structure shown in Figure 3 permits of an adjustment of the compressional stress exerted on the Neoprene rings 46 independent of the thrust pressure exerted between the ring 47 and the sleeve 40 when the retaining collar 50 is moved to an adjusted position along the shaft.

As explained hereinbefore, the improved seal unit positively prevents the creepage of any liquid along the shaft from the interior of the pump casing. However, I have found that in a room which contains acid pumping machinery, there is bound to be a certain quantity of acid fumes in the atmosphere. Small amounts of acid may escape at the joint 2 of the casing, also at the couplings between pipes, and various other places. These fumes may tend to settle and condense on any of the surfaces external or internal of the seal parts, leaving a sulphate film which in time becomes a hard crust. The crust may be deposited on the threads 48 and may prevent the relative movement between the sleeve 45 and the retaining collar 44. The convolutions of the spring 32 may also become encrusted and lose at least a part of their resiliency.

The modification shown in Figure 6 is designed especially to prevent entry of acid fumes from whatever source in order that all parts of the seal may continue to operate at their highest efficiency during the life of the unit. In this figure the hub of the casing is illustrated at 19, and there is provided a graphite packing ring 18 within the casing hub and surrounding the pump shaft 9. There is a thrust ring 52 bearing against the left-hand surface of the hub 19 and surrounding the shaft. This ring is provided with a shouldered portion 53, which is positioned within the flange 25 of a packing sleeve 45, similar to that explained in connection with Figure 3. The sleeve 45 is provided with internal threads which engage a threaded portion on a metal retaining collar 54. This collar is provided with a radially extending shoulder 55 which loosely surrounds the shaft to provide an annular space for a pair of Neoprene rings 46. This retaining collar is provided with four or more longitudinally extending openings similar to the collar 44 in Figure 3 for loosely receiving compression springs 32. The left-hand ends of the springs 32 bear against a set collar 56, and the other ends of the springs abut the thrust ring 52. The latter is preferably formed of graphite, and the purpose of the springs is to force the graphite ring against the bearing surface of the casing hub 19.

The retaining collar is secured to the shaft 9 by two or more set screws 30 (shown in Figure 4). There is also a pair of headless set screws 49 which are threaded in openings provided in the retaining collar 54, these screws bearing against the left-hand surface of the shouldered portion 53 of the ring 52. The set collar 56 is provided with a pair of diametrically positioned countersunk openings which loosely receive the set screws 49. It will be noted that the structure shown in Figure 6 differs from Figure 3 in that the set screws 49 are not accessible from the exterior of the set collar 56. In this case the set screws 49 must be adjusted in position, i. e. after the packing sleeve 45 has been screwed onto the retaining collar 54 before the set screws 49 are caused to enter the openings in the set collar. In the structure shown in Figure 3 the set screws 49 can be adjusted even after the set collar 50 has been tightened in position on the shaft, but the purpose of the set screws 49, shown in Figure 6, is exactly the same as the purpose of the corresponding elements shown in Figure 3.

In order to prevent the entry of acid fumes into the interior of the seal unit, all of the parts are packed with heavy grease when the seal is assembled. The grease is prevented from oozing out of the space between the set collar 56 and the retaining collar 54 by means of a pair of overlapping flanges 57, 58 provided at the edges of the respective collars. Thus all of the spaces between the operating parts are filled with grease, and the grease is effectively retained within the seal unit as every possible opening or crevice is closed by the parts of the unit. In order to take care of any hardening of the grease, there is provided an arrangement by which lubricating oil may be readily supplied to the seal unit. For this purpose a hole 59 is drilled radially of the set collar 56, and a small opening 60 places this hole in communication with the annular space between the collars 56 and 54.

An oil fitting 61 of any suitable and well known type, for example, that sold on the market under the name of "Handy Oiler," may be driven into the opening 59. The oiler unit may include a ball 62 which is held in closed position by a compression spring 63. The oiler unit permits the introduction of liquid lubricant into the interior of the seal unit to prevent hardening of the grease therein and to some extent to take the place of any grease which may have leaked out of the unit over considerable periods of time. I have found that when the improved seal is packed with grease and oil added from time to time, all sulphate or other encrustation formed by acid fumes may be entirely eliminated so that the seal unit may be readily taken apart at any time and no permanent tightening effects take place between the parts, but the latter are always capable of being relatively moved in order to effect any necessary adjustments.

It will be understood that I desire to comprehend within my invention such modifications as come within the scope of the claims and the invention.

Having thus fully described my invention, what I claim as new and desire to secure by Letters Patent, is:

1. A seal structure for the pump shaft of a fluid pressure pump comprising in combination a radial bearing packing ring contained between a pair of retaining collars which are screwed together and surround the shaft, whereby as the threads are tightened the packing ring is placed under compressional stress to increase the pressure exerted by the ring on the shaft, and means including at least one set screw which is threaded into one of the retaining collars and bears against the other collar for locking the two collars in position in order to prevent any unscrewing movement between the collars.

2. A seal structure for the pump shaft of a fluid pressure pump comprising in combination a radial bearing packing ring contained between a pair of retaining collars which are screwed together and surround the shaft, whereby as the threads are tightened the packing ring is placed under compressional stress to increase the pressure exerted by the ring on the shaft, and means including at least one set screw which is threaded into one of the retaining collars and bears against the other collar for locking the two collars in position in order to prevent any unscrewing movement between the collars, one of said retaining collars including an end thrust packing ring which is adapted to bear against the casing of the pump and means for holding the last-mentioned ring in a position to receive the end thrusts of the shaft.

3. A seal structure for the pump shaft of a fluid pressure pump comprising in combination a radial bearing packing ring contained between a pair of retaining collars which are screwed together and surround the shaft whereby as the threads are tightened the packing ring is placed under compressional stress to increase the pressure exerted by the ring on the shaft, means including at least one set screw which is threaded into one of the retaining collars and bears against the other collar for locking the two collars in position in order to prevent any unscrewing movement between the collars, one of said retaining collars including an end thrust packing ring which is adapted to bear against the casing of the pump, and means for holding the last-mentioned ring in a position to receive the end thrusts of the shaft, said means comprising a set collar which is secured to the shaft, and compression springs between the collar and the end thrust packing ring.

4. A seal structure for the pump shaft of a fluid pressure pump comprising in combination a pair of retaining collars adjustably secured together, a packing ring between said collars, said collars and packing ring surrounding said shaft whereby as the retaining collars are moved toward one another the packing ring is placed under compression to bear radially against said shaft, means for locking the retaining collars in their final position, said means comprising at least one set screw which is threaded in one of the collars and bears against the other collar, the end of the set screw opposite the bearing end projecting beyond the collar in which it is threaded and adapted to constitute a driving pin by which the seal structure is caused to rotate with the shaft.

5. A seal for a fluid pressure pump having a casing and an impeller shaft, said seal comprising a pair of retaining collars which are screwed together and surround the shaft, a packing ring positioned between said collars whereby as the collars are moved together the ring is placed under compression to cause the ring to bear against the shaft, one of said collars including an end thrust bearing element which is adapted to abut an end bearing surface on said casing, means for resiliently pressing the end thrust bearing element against said casing, said means comprising a set collar which is secured to the shaft, springs positioned between said set collar and said end thrust bearing element, and a common means for locking said retaining collars in their adjusted position and for driving said retaining collars from said set collar.

6. A seal for a fluid pressure pump having a casing and an impeller shaft, said seal comprising a pair of retaining collars which are screwed together and surround the shaft, a packing ring positioned between said collars whereby as the collars are moved together the ring is placed under compression to cause the ring to bear against the shaft, one of said collars including an end thrust bearing element which is adapted to abut an end bearing surface on said casing, means for resiliently pressing the end thrust bearing element against said casing, said means comprising a set collar which is secured to the shaft, springs positioned between said set collar and said end thrust bearing element, and a common means for locking said retaining collars in their adjusted position and for driving said retaining collars from said set collar, said means comprising at least one set screw which is threaded in one of said retaining collars and bears against the other of said retaining collars, said set screw being adapted to be received by an opening in said set collar.

7. A seal structure for the pump shaft of a fluid pressure pump comprising in combination a radial thrust packing ring contained between a pair of retaining collars, said collars being screwed together in order to place the packing ring under compression and thereby to increase its pressure against the shaft, an end thrust packing ring being secured to one of said collars, means for pressing said last-mentioned ring against the casing of the pump in order to prevent radial leakage, said means comprising a set collar secured to the shaft and mechanical pressure elements positioned between the set collar and said end thrust packing ring, all of the space within the seal structure and between the various collars being closed off from the exterior in order that the space may retain material which excludes acid fumes, said mechanical pressure elements including a plurality of springs which bear against said collar and against said end thrust packing ring and also including at least one set screw which is threaded in one of said retaining collars and bears against the other collar, and means for driving said seal structure from said set collar, said means comprising a driving pin which extends from the seal structure and projects into an opening formed in the set collar.

8. A seal structure for the pump shaft of a fluid pressure pump having a stationary casing comprising an end portion, said seal structure comprising in combination a bearing packing ring contained between a pair of retaining collars, adjusting means for varying the compression in said packing ring whereby its contact with the circumference of said shaft is increased, means for locking said adjusting means in adjusted position, and means independent of said adjusting and locking means for longitudinally adjusting said entire seal structure whereby one of said retaining collars is directly urged towards and brought in contact with the stationary end portion of the casing.

OYSTEIN JACOBSEN.